United States Patent
Song et al.

(10) Patent No.: US 11,316,149 B2
(45) Date of Patent: Apr. 26, 2022

(54) POSITIVE ELECTRODE MIX, POSITIVE ELECTRODE INCLUDING THE SAME, AND LITHIUM SECONDARY BATTERY

(71) Applicant: LG Chem, Ltd., Seoul (KR)

(72) Inventors: Jooyong Song, Daejeon (KR); Seok Koo Kim, Daejeon (KR); In Chul Kim, Daejeon (KR); Juri Kim, Daejeon (KR)

(73) Assignee: LG Energy Solution, Ltd.

( * ) Notice: Subject to any disclaimer, the term of this patent is extended or adjusted under 35 U.S.C. 154(b) by 257 days.

(21) Appl. No.: 16/607,309

(22) PCT Filed: Nov. 27, 2018

(86) PCT No.: PCT/KR2018/014724
§ 371 (c)(1),
(2) Date: Oct. 22, 2019

(87) PCT Pub. No.: WO2019/103575
PCT Pub. Date: May 31, 2019

(65) Prior Publication Data
US 2020/0335773 A1 Oct. 22, 2020

(30) Foreign Application Priority Data
Nov. 27, 2017 (KR) .......... 10-2017-0159733
Nov. 27, 2018 (KR) .......... 10-2018-0148220

(51) Int. Cl.
*H01M 4/36* (2006.01)
*H01M 4/131* (2010.01)
(Continued)

(52) U.S. Cl.
CPC .......... *H01M 4/364* (2013.01); *H01M 4/131* (2013.01); *H01M 4/133* (2013.01); *H01M 4/134* (2013.01);
(Continued)

(58) Field of Classification Search
CPC ...... H01M 4/364; H01M 4/131; H01M 4/133; H01M 4/134; H01M 4/525; H01M 4/623; H01M 10/0525
See application file for complete search history.

(56) References Cited

U.S. PATENT DOCUMENTS 8,953,303 B2 2/2015 Kim et al.
9,705,136 B2 7/2017 Rojeski
(Continued)

FOREIGN PATENT DOCUMENTS

CN 1340220 A 3/2002
CN 102468507 A 5/2012
(Continued)

OTHER PUBLICATIONS

Bie et al., Li2O2 as a cathode additive for the initial anode irreversibility compensation in lithium-ion batteries, Chemical Communication, vol./Issue 53, pp. 8324-8327, published Jun. 2017 (Year: 2017).*
(Continued)

*Primary Examiner* — Jayne L Mershon
(74) *Attorney, Agent, or Firm* — Lerner, David, Littenberg, Krumholz & Mentlik, LLP

(57) ABSTRACT

A positive electrode mix, a positive electrode, and a lithium secondary battery, each including the positive electrode mix, are provided. Specifically, the positive electrode mix includes lithium peroxide ($Li_2O_2$) and platinum (Pt), thereby effectively counterbalancing an irreversible capacity imbalance between both electrodes and further increasing the initial charge capacity of the positive electrode.

14 Claims, 2 Drawing Sheets

(51) Int. Cl.
   *H01M 4/133* (2010.01)
   *H01M 4/134* (2010.01)
   *H01M 10/0525* (2010.01)
   *H01M 4/525* (2010.01)
   *H01M 4/62* (2006.01)
   *H01M 4/02* (2006.01)

(52) U.S. Cl.
   CPC ........ *H01M 4/525* (2013.01); *H01M 4/623* (2013.01); *H01M 10/0525* (2013.01); *H01M 2004/021* (2013.01); *H01M 2004/027* (2013.01); *H01M 2004/028* (2013.01)

(56) References Cited

U.S. PATENT DOCUMENTS

| | | | |
|---|---|---|---|
| 2002/0031667 | A1 | 3/2002 | Kelley et al. |
| 2004/0091774 | A1 | 5/2004 | Narang et al. |
| 2012/0122016 | A1 | 5/2012 | Jiang et al. |
| 2012/0315554 | A1 | 12/2012 | Christensen et al. |
| 2013/0011752 | A1 | 1/2013 | Tanaami et al. |
| 2013/0089796 | A1 | 4/2013 | Sun et al. |
| 2014/0295298 | A1 | 10/2014 | Zhang et al. |
| 2016/0372784 | A1* | 12/2016 | Hayner .......... H01M 10/0525 |
| 2017/0194625 | A1* | 7/2017 | Woehrle .......... H01M 4/131 |
| 2019/0020030 | A1 | 1/2019 | Umetsu et al. |

FOREIGN PATENT DOCUMENTS

| | | |
|---|---|---|
| CN | 103035979 B | 4/2015 |
| CN | 104716382 A | 6/2015 |
| JP | 2005516347 A | 6/2005 |
| JP | 200891248 A | 4/2008 |
| JP | 2010225291 A | 10/2010 |
| JP | 2011108505 A | 6/2011 |
| JP | 2011210609 * | 10/2011 |
| JP | 2011210609 A | 10/2011 |
| JP | 2013033732 A | 2/2013 |
| JP | 5541502 B2 | 7/2014 |
| JP | 2017528881 A | 9/2017 |
| KR | 20110119575 A | 11/2011 |
| KR | 101229570 B1 | 2/2013 |
| KR | 101338142 B1 | 12/2013 |
| KR | 20150124673 A | 11/2015 |
| KR | 20160093823 A | 8/2016 |
| KR | 20160128014 A | 11/2016 |
| KR | 20170057249 A | 5/2017 |
| TW | 201737542 A | 10/2017 |

OTHER PUBLICATIONS

Extended European Search Report including Written Opinion for Application No. EP18881949.4, dated May 6, 2020, pp. 1-7.
Bie et al., "Li2O2 as a cathode additive for the initial anode irreversibility compensation in lithium-ion batteries", Chem. Commun. vol. 53, Jun. 2017, pp. 8324-8327.
International Search Report from Application No. PCT/KR2018/014724 dated Mar. 5, 2019, pp. 1-2.
Search Report dated Jan. 10, 2022 from the Office Action for Chinese Application No. 201880023953.6 dated Jan. 19, 2022, 3 pages.

* cited by examiner

【FIG. 1】
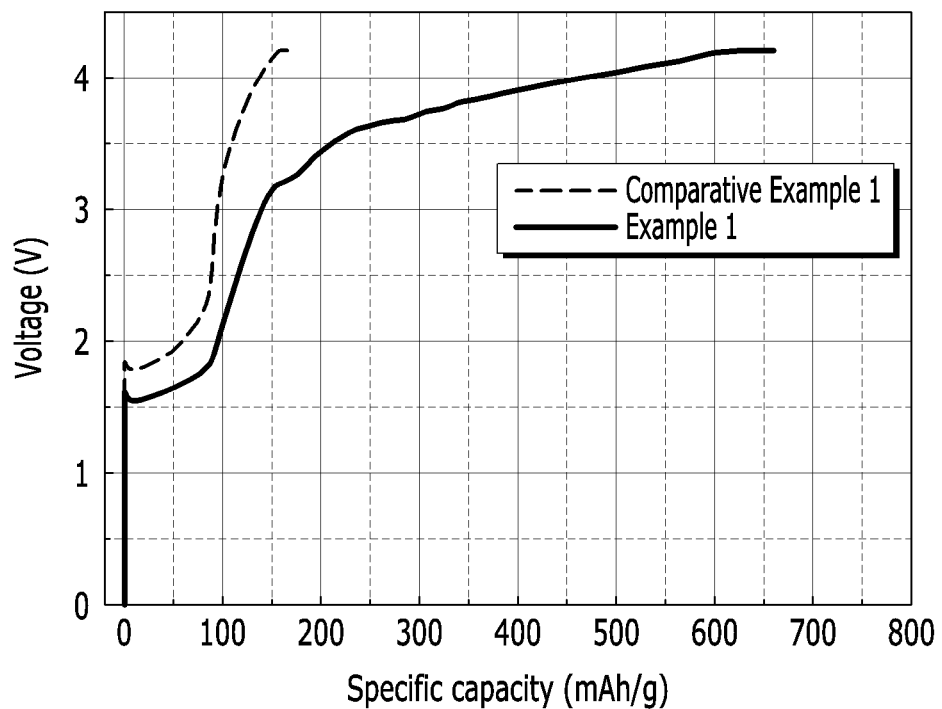

[FIG. 2]
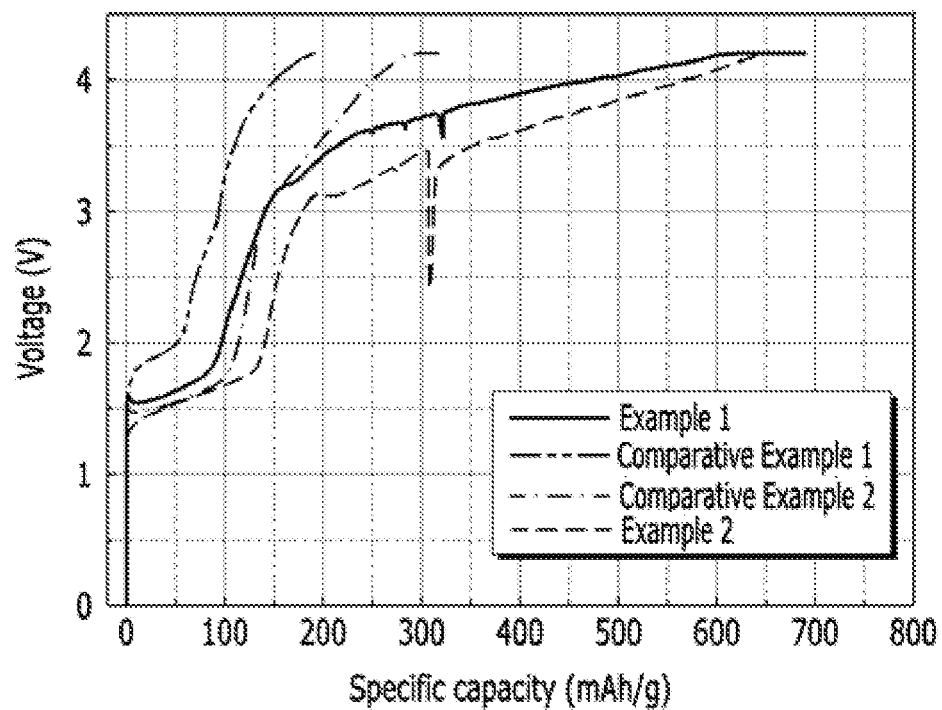

POSITIVE ELECTRODE MIX, POSITIVE ELECTRODE INCLUDING THE SAME, AND LITHIUM SECONDARY BATTERY

CROSS-REFERENCE TO RELATED APPLICATION

The present application is a national phase entry under 35 U.S.C. § 371 of International Application No. PCT/KR2018/014724 filed Nov. 27, 2018, which is based on, and claims priority from, Korean Patent Application Nos. 10-2017-0159733 and 10-2018-0148220, filed on Nov. 27, 2017 and Nov. 27, 2018, respectively, the disclosures of all of which are hereby incorporated by reference herein in their entirety.

TECHNICAL FIELD

The present invention relates to a positive electrode mix, a positive electrode including the same, and a lithium secondary battery.

BACKGROUND ART

A lithium secondary battery creates electrical energy via oxidation/reduction reactions of electrodes by employing electrode active materials capable of reversible intercalation/deintercalation of lithium ions as a negative electrode and a positive electrode, and by allowing movement of lithium ions via an electrolyte.

However, during initial charge/discharge ($1^{ST}$ cycle charge-discharge) of a lithium secondary battery, lithium ions which are deintercalated (battery discharge) after being intercalated (battery charge) into a negative electrode and lithium ions which are not deintercalated (battery discharge) after being intercalated (battery charge) from a positive electrode are inevitably generated, respectively. This is associated with irreversible capacities of both electrodes.

When a difference between the irreversible capacities of both electrodes is larger, the initial efficiency of the positive electrode may be decreased, and the energy density during operation of the battery may be gradually decreased, leading to reduction in lifetime of the battery.

DISCLOSURE

Technical Problem

One embodiment of the present invention provides a positive electrode mix including lithium peroxide ($Li_2O_2$) which irreversibly releases lithium ions ($Li^+$) during initial charge of a battery to compensate for irreversible capacity of a negative electrode, and platinum (Pt) which is a catalyst that improves efficiency of the release reaction of the lithium ions ($Li^+$).

Specifically, the positive electrode mix of one embodiment includes an additive including: the lithium peroxide ($Li_2O_2$) and platinum; a positive electrode active material; and a conductive material, wherein a content of the platinum is controlled in an amount of 7% by weight or more to 20% by weight or less, as the total weight of the platinum and the conductive material is regarded as 100% by weight. Thus, there is a critical significance in that the irreversible capacity imbalance between the electrodes may be effectively counterbalanced and the initial charge capacity of the positive electrode may be significantly increased.

Technical Solution

Advantages and features of embodiments of the present invention and methods for achieving them will be made clear from embodiments described in detail below. The present invention may, however, be embodied in many different forms, and should not be construed as being limited to the embodiments set forth herein. Rather, these embodiments are provided so that this disclosure will be thorough and complete, and will fully convey the scope of the invention to those skilled in the art to which the present invention pertains. The present invention is merely defined by the scope of the claims.

Unless otherwise defined, technical and scientific terms used herein have the same meaning as commonly understood by those skilled in the art to which this invention pertains. Additionally, repeated explanations on the technical constitutions and actions equivalent to those of the conventional ones will be omitted.

Throughout the specification, when an element is referred to as being "connected" to another element, the element is "directly connected" to another element or "electrically connected" to another element with one or more intervening elements interposed therebetween.

Throughout the specification, when one member is referred to as being "on" another member, one member may be adjacent to another member or intervening members may exist therebetween.

Throughout the specification, when an element "includes" other elements, it means that other elements may be further included rather than other elements being excluded, unless content to the contrary is specially described.

Throughout the specification, the term "about" or "substantially" is intended to have meanings close to numerical values or ranges specified with an allowable error and are intended to prevent accurate or absolute numerical values disclosed for understanding of the present disclosure from being illegally or unfairly used by any unconscionable third party.

Throughout the specification, the term "step of" does not mean "step for".

Throughout the specification, the term "combination(s) of" included in a Markush-type description means a mixture or a combination of one or more components selected from a group consisting of components described in a Markush type, and means that the disclosure includes one or more selected from the group consisting of the components.

Throughout the specification, a phrase in the form "A and/or B" means "A or B, or A and B".

Positive Electrode Mix

On the basis of experimental results, a positive electrode mix of one embodiment of the present invention includes: a positive electrode active material; a conductive material; and an additive including lithium peroxide ($Li_2O_2$) and platinum (Pt), wherein a content of the platinum in the total of 100% by weight of the platinum and the conductive material is controlled to 7% by weight or more to 20% by weight or less.

According to the experimental basis, as in the positive electrode mix of one embodiment, when the content of the platinum in the total of 100% by weight of the platinum and the conductive material is controlled to specifically 7% by weight or more to 20% by weight or less, more specifically 8% by weight or more to 17% by weight or less, and much more specifically 10% by weight or more to 15% by weight or less, it is significant in obtaining initial charge capacity of the positive electrode at 600 mAh/g or more, more specifically 650 mAh/g or more, and much more specifically 690 mAh/g or more.

It has been pointed out that, during initial charge/discharge ($1^{ST}$ cycle charge-discharge) of a lithium secondary battery, irreversible capacities of two electrodes inevitably appear. When a difference between the irreversible capacities of the two electrodes is larger, the initial efficiency of the positive electrode is decreased, leading to deterioration in lifetime of the battery.

For example, when a silicon-based negative electrode active material having a larger theoretical capacity than a carbon-based negative electrode active material is applied to a negative electrode while applying the same positive electrode active material to a positive electrode, an imbalance between irreversible capacities of both electrodes may increase, and charge capacity of the positive electrode after initial charge/discharge may be decreased.

From recognition of the above problems, one embodiment of the present invention provides a positive electrode mix capable of counterbalancing an irreversible capacity imbalance between both electrodes and increasing the initial efficiency of the positive electrode.

The positive electrode mix of one embodiment may include the additive including lithium peroxide ($Li_2O_2$) and platinum (Pt), thereby effectively counterbalancing the irreversible capacity imbalance between both electrodes and further increasing the initial charge capacity of the positive electrode.

Specifically, in the positive electrode additive, the lithium peroxide ($Li_2O_2$) may include a large amount of lithium, as compared with a common positive electrode active material including about 1 mole of lithium, thereby releasing a large amount of lithium.

More specifically, the lithium peroxide ($Li_2O_2$) may irreversibly release lithium ion and oxygen. The reaction is an oxygen evolution reaction (OER) of the following Reaction Scheme 1, whereby 1 mole of oxygen and 2 moles of lithium ions may be irreversibly released from 1 mole of lithium peroxide ($Li_2O_2$).

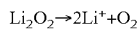    [Reaction Scheme 1]

Therefore, a lithium secondary battery including a positive electrode to which lithium peroxide ($Li_2O_2$) is added may exhibit reduced irreversible capacity of a negative electrode during initial charge/discharge, thereby counterbalancing the irreversible capacity imbalance between the negative electrode and the positive electrode and increasing initial efficiency of the positive electrode.

However, when lithium peroxide ($Li_2O_2$) is applied alone, the efficiency of Reaction Scheme 1 is poor at an initial charge voltage of, for example, 2.5 V to 4.25 V (vs. $Li/Li^+$). In this regard, according to experimental results described below, when only lithium peroxide ($Li_2O_2$) is used without Pt during preparation of the positive electrode mix (Comparative Example 1), the initial charge capacity of the positive electrode is found to be only 180 mAh/g.

Accordingly, in one embodiment, platinum (Pt) is applied as a catalyst for improving the efficiency of Reaction Scheme 1. In other words, when lithium peroxide together with platinum are added to a positive electrode, the efficiency of Reaction Scheme 1 may be increased, as compared with only use of lithium peroxide in the positive electrode.

This may be because the platinum serves as a catalyst in the oxygen evolution reaction (OER) of Reaction Scheme 1 proceeded by the lithium peroxide ($Li_2O_2$) to contribute to improvement of the reaction efficiency of Reaction Scheme 1.

However, even if both the lithium peroxide ($Li_2O_2$) and the platinum are added to the positive electrode, initial charge capacity characteristics of the positive electrode may greatly vary depending on the relative amount of the platinum to the conductive material.

In this regard, according to experimental results described below, when the positive electrode mix is prepared by including the conductive material, and the additive including the lithium peroxide ($Li_2O_2$) and platinum (Pt), wherein the content of the platinum in the total of 100% by weight of the platinum and the conductive material is controlled to 5% by weight (Comparative Example 2), the initial charge capacity of the positive electrode is found to be improved, as compared with a positive electrode mix without Pt (Comparative Example 1), but the initial charge capacity is merely about 315 mAh/g.

In contrast, when the content of the platinum in the total of 100% by weight of the platinum and the conductive material is controlled to 7% by weight or more to 20% by weight or less, more specifically 8% by weight or more to 17% by weight or less, and much more specifically 10% by weight or more to 15% by weight or less (Examples 1 and 2), the initial charge capacity of the positive electrode is increased by twice or more, as compared with that of a positive electrode prepared by using 5% by weight of the platinum (Comparative Example 2).

In the experiment described below, to confirm the effect of the additive on the initial performance of the battery, no positive electrode active material was blended as an extreme case. In order to further improve the initial performance of the battery while securing long-term lifetime characteristics, the positive electrode active material may be blended with the positive electrode additive of one embodiment at a proper blending ratio according to desired characteristics of the battery.

Therefore, when the positive electrode mix is prepared by including the positive electrode active material, the conductive material, and the additive including lithium peroxide ($Li_2O_2$) and platinum (Pt), wherein the content of the platinum in the total of 100% by weight of the platinum and the conductive material is controlled to 7% by weight or more to 20% by weight or less, more specifically 8% by weight or more to 17% by weight or less, it is inferred that the initial charge capacity of the positive electrode may be remarkably improved.

Blending of Additive and Positive Electrode Mix Including Additive

In the blending of the additive and the positive electrode mix including the additive, a weight ratio of lithium peroxide to platinum and a content of the conductive material in the total weight of the positive electrode mix may be considered.

In the additive, a weight ratio of the lithium peroxide and the platinum may be 100:0.1 to 100:50, for example, 100:0.5 to 100:20, 100:1 to 100:10, or 100:7 to 100:20. When the weight ratio satisfies this range, the above-described effects may be improved, but it is not limited thereto.

Meanwhile, the content of the conductive material in the positive electrode mix may be in the range of 0.1% by weight to 10% by weight, for example, 0.5% by weight to 3% by weight, which is commonly applied in the art, with respect to the total weight (100% by weight) of the positive electrode mix.

Considering all of the weight ratio of platinum/conductive material, the weight ratio of lithium peroxide to platinum, and the content of the conductive material in the total weight of the positive electrode mix, the content of the conductive material in the positive electrode mix may be controlled to 0.1% by weight to 10% by weight, for example 0.5% by weight to 3% by weight, with respect to the total weight (100% by weight) of the positive electrode mix, the content of the platinum may be controlled to 7% by weight or more to 20% by weight or less, more specifically 8% by weight or more to 17% by weight or less, and much more specifically 10% by weight or more to 15% by weight or less, with respect to the total of 100% by weight of the platinum and the conductive material, the total amount of the positive electrode additive including the platinum (Pt) and the lithium peroxide ($Li_2O_2$) may be controlled to 1% by weight to 20% by weight, for example 1% by weight to 10% by weight, or 5% by weight to 10% by weight. When the respective contents satisfy the above ranges, the initial charge capacity of the positive electrode may be further improved, but the present invention is not limited thereto.

Method of Preparing Additive

A raw material for the additive or a method of preparing the additive is not particularly limited.

For example, respective powders of lithium peroxide ($Li_2O_2$) and platinum (Pt) are used as raw materials, and these powders are dry-mixed, and this simple mixed powder may be used as the positive electrode additive of one embodiment. When the positive electrode additive of one embodiment is embodied as the simple mixed powder, respective powders of lithium peroxide ($Li_2O_2$) and platinum (Pt) may be dry-mixed with other components of the positive electrode mix (e.g., a positive electrode active material, a conductive material, and/or a binder) at once, as in examples described below. Alternatively, respective powders of lithium peroxide ($Li_2O_2$) and platinum (Pt) may be first dry-mixed, and then dry-mixed with other components of the positive electrode mix.

Alternatively, each of the powders is dissolved in an NMP solvent, and resulting solutions are wet-mixed with each other using an apparatus such as a paste mixer, etc. Then, heat treatment is performed at 40° C. to 150° C., or heat treatment is omitted, and the resultant is dried in an oven at 40° C. to 150° C. to obtain spherical particles, which may be used as the additive.

Conditions for each process of preparing the positive electrode additive, exemplified herein, are not limited. In addition to the exemplified method, a method commonly known in the art may be used to prepare the positive electrode additive of one embodiment.

Kind of Conductive Material

The kind of the conductive material is not particularly limited. For example, the conductive material is used to provide an electrode with conductivity, and is not particularly limited as long as it has electrical conductivity without causing chemical changes in the battery. Examples thereof may include natural graphite, artificial graphite, carbon black, acetylene black, Ketjen black, carbon fibers, metallic powders or metallic fibers of copper, nickel, aluminum, silver, etc., and conductive materials such as polyphenylene derivatives, etc., may be used alone or in a mixture of one or more thereof.

Kind of Active Material and Content Thereof in Positive Electrode Mix

Further, in the positive electrode mix of one embodiment, the kind of the positive electrode active material is not particularly limited, as long as it includes one or more of composite oxides of cobalt, manganese, nickel, or a combination thereof and lithium, and is capable of reversible intercalation/deintercalation of lithium ions. For example, the positive electrode active material may include one or more of composite oxides of cobalt, manganese, nickel, or a combination thereof and lithium.

More specifically, as the positive electrode active material, a compound represented by any one of the following chemical formulae may be used: $Li_aA_{1-b}R_bD_2$ (wherein $0.90 \leq a \leq 1.8$ and $0 \leq b \leq 0.5$); $Li_aE_{1-b}R_bO_{2-c}D_c$ (wherein $0.90 \leq a \leq 1.8$, $0 \leq b \leq 0.5$, and $0 \leq c \leq 0.05$); $LiE_{2-b}R_bO_{4-c}D_c$ (wherein $0 \leq b \leq 0.5$ and $0 \leq c \leq 0.05$); $Li_aNi_{1-b-c}Co_bR_cD_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Co_bR_cO_{2-\alpha}Z_\alpha$ (wherein $0.90 \leq a \leq 1.8$, $0 \leq b \leq 0.5$, $0 \leq c \leq 0.05$, and $0 \leq \alpha < 2$); $Li_aNi_{1-b-c}Co_bR_cO_{2-\alpha}Z_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bR_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bR_cO_{2-\alpha}Z_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bR_cO_{2-\alpha}Z_2$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$ and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$ and $0.001 \leq b \leq 0.1$); $Li_aCoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2G_bO_4$ (wherein $0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the above Chemical Formulae, A is Ni, Co, Mn, or a combination thereof; R is Al, Ni, Co, Mn, Cr, Fe, Mg, Sr, V, a rare-earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

A compound forming a coating layer on the surface of the above compound may be used, or a mixture of the above compound and the compound forming a coating layer may be used. The coating layer may include an oxide or hydroxide of a coating element, an oxyhydroxide of a coating element, an oxycarbonate of a coating element, or a hydroxycarbonate of a coating element as a coating element compound. The compounds constituting these coating layers may be non-crystalline or crystalline. The coating element included in the coating layer may be Mg, Al, Co, K, Na, Ca, Si, Ti, V, Sn, Ge, Ga, B, As, Zr, or a mixture thereof. A process of forming the coating layer may be any coating method as long as the method (e.g., a spray coating method, an immersion method, etc.) does not adversely affect physical properties of the positive electrode active material even when the above elements are used in the compound. Since the explanation thereof may be understood by those skilled in the art, it will be omitted.

Regardless of the kind of the positive electrode active material, the content of the positive electrode active material in the total weight (100% by weight) of the positive electrode mix may be 80% by weight to 99.5% by weight, which is merely a range considering a blending amount generally applied in the art, but is not limited thereto.

Binder

Meanwhile, the positive electrode mix of one embodiment may further include a binder.

The binder functions to improve adhesion between the positive electrode active material particles, and adhesion of the positive electrode active material to a current collector. Representative examples thereof may include polyvinyl alcohol, carboxymethyl cellulose, hydroxypropyl cellulose, diacetyl cellulose, polyvinyl chloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, etc., but are not limited thereto.

The positive electrode mix of one embodiment may be prepared by a method generally known in the art, and detailed explanation thereof will be omitted.

Positive Electrode and Lithium Secondary Battery

Another embodiment of the present invention provides a positive electrode including the above-described positive electrode mix, and a lithium secondary battery including the positive electrode.

The lithium secondary battery of an embodiment is a lithium secondary battery in which the above-described positive electrode additive is applied to the positive electrode, and the lithium secondary battery may exhibit reduction in the initial irreversible capacity of a negative electrode, an increase in the initial efficiency of the positive electrode, and excellent lifetime characteristics by inhibiting energy density reduction during operation.

Specifically, when the lithium secondary battery is charged at room temperature to 2.5 to 4.25 V (vs. Li/Li$^+$) once, a charge capacity of the positive electrode may be 600 mAh/g or more, specifically 690 mAh/g or more. Detailed explanation thereof is the same as described above.

The lithium secondary battery of one embodiment may be fabricated according to methods generally known in the art, except that the above-described positive electrode additive and positive electrode mixes are used.

Hereinafter, those generally known in the art will be simply suggested, but these are for illustrative purposes only, and the positive electrode mix of one embodiment is not limited thereto.

The positive electrode of one embodiment may include a positive electrode collector, and a positive electrode mix layer which is disposed on the positive electrode collector and includes the above-described positive electrode mix.

Specifically, the positive electrode of one embodiment may be fabricated by applying the electrode mix of the positive electrode additive, the conductive material, the positive electrode active material, and/or the binder onto the positive electrode collector, and then drying it. If necessary, a filler may be further added to the mix.

The positive electrode collector may be fabricated in a thickness of 3 μm to 500 μm. The positive electrode collector is not particularly limited as long as it has high conductivity without causing chemical changes in a battery. For example, stainless steel, aluminum, nickel, titanium, calcined carbon, and aluminum or stainless steel that is surface-treated with carbon, nickel, titanium, or silver may be used. Adhesion of the positive electrode active material may be increased by forming fine roughness on the surface of the collector, and the collector may be in a variety of forms such as a film, a sheet, a foil, a net, a porous material, a foamed material, a non-woven fabric material, etc.

The conductive material may be generally added in an amount of 1% by weight to 50% by weight with respect to the total weight of the mix including the positive electrode active material. The conductive material is not particularly limited, as long as it has conductivity without causing chemical changes in the battery. For example, graphite such as natural or artificial graphite; carbon black such as carbon black, acetylene black, Ketjen black, channel black, furnace black, lamp black, thermal black, etc.; conductive fibers such as carbon fibers, metallic fibers, etc.; metallic powders such as carbon fluoride, aluminum, nickel powder, etc.; conductive whiskers such as zinc oxide, potassium titanate, etc.; conductive metal oxides such as titanium oxide, etc.; and polyphenylene derivatives, etc., may be used as the conductive material.

Meanwhile, graphite-based materials having an elastic property may be used as the conductive material, and may also be used along with the above materials.

The binder assists in improving adhesion between the active materials and the conductive material, and adhesion between the active material and the collector. The binder may be generally added in an amount of 1% by weight to 50% by weight with respect to the total weight of the mix including the positive electrode active material. Specific examples thereof may include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, an ethylene-propylene-diene polymer (EPDM), sulfonated-EPDM, styrene butadiene rubber, fluorine rubber, or various copolymers.

The filler is a component that is optionally used to inhibit expansion of the positive electrode. The filler is not particularly limited, as long as it is a fibrous material without causing chemical changes in the battery. For example, olefinic polymers such as polyethylene, polypropylene, etc, and fibrous materials such as glass fibers, carbon fibers, etc., may be used.

The negative electrode may include a collector and a negative electrode active material layer formed on the collector, wherein the negative electrode active material layer may include a negative electrode active material.

The negative electrode active material may be one or more negative electrode active materials selected from the group consisting of carbon-based negative electrode active materials, lithium metal, an alloy of lithium metal, Si, SiO$_x$ (0<x<2), a Si—C composite, a Si-Q alloy (wherein Q is an alkali metal, an alkaline earth metal, an element of Group 13 to Group 16, a transition metal, a rare earth element, or a combination thereof, excluding Si), Sn, SnO$_2$, a Sn—C composite, and Sn—R (wherein R is an alkali metal, an alkaline earth metal, an element of Group 13 to Group 16, a transition metal, a rare earth element, or a combination thereof, excluding Sn).

The negative electrode collector may be commonly fabricated in a thickness of 3 μm to 500 μm. The negative electrode collector is not particularly limited as long as it has conductivity without causing chemical changes in a battery. For example, copper, stainless steel, aluminum, nickel, titanium, calcined carbon, or copper or stainless steel that is surface-treated with carbon, nickel, titanium, or silver, or an aluminum-cadmium alloy, may be used. Also, like the positive electrode collector, adhesion of the negative electrode active material may be increased by forming fine roughness on the surface of the collector. The collector may be in a variety of forms such as a film, a sheet, a foil, a net, a porous material, a foamed material, a non-woven fabric material, etc.

The lithium secondary battery of one embodiment may be a lithium ion battery, a lithium ion polymer battery, or a lithium polymer battery according to the kind of electrolyte and/or the kind of separator.

When the lithium secondary battery of one embodiment is a lithium ion battery to which a liquid electrolyte is applied, the liquid electrolyte may be applied after immersing a separator therein. The separator is interposed between the positive electrode and the negative electrode. As the separator, an insulating thin film having high ion permeability and mechanical strength is used. The separator generally has a pore diameter of 0.01 μm to 10 μm and a thickness of 5 μm to 300 μm. As the separator, for example, a sheet or non-woven fabric made of an olefin polymer, such as polypropylene having chemical resistance and hydrophobicity, etc.; glass fiber; or polyethylene is used. When a solid electrolyte such as a polymer is employed as the electrolyte, the solid electrolyte may serve as both the separator and the electrolyte.

The liquid electrolyte may be a non-aqueous electrolyte containing lithium salts. The non-aqueous electrolyte containing lithium salts is composed of a non-aqueous electrolyte and lithium. A non-aqueous organic solvent, an organic solid electrolyte, or an inorganic solid electrolyte may be used as the non-aqueous electrolyte. However, the non-aqueous electrolyte is not limited thereto.

The non-aqueous organic solvent may be, for example, a non-protic organic solvent such as N-methyl-2-pyrrolidone, propylene carbonate, ethylene carbonate, butylene carbonate, dimethyl carbonate, diethyl carbonate, gamma butyrolactone, 1,2-dimethoxy ethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc.

The organic solid electrolyte may include, for example, polyethylene derivatives, polyethylene oxide derivatives, polypropylene oxide derivatives, phosphoric acid ester polymer, polyagitation lysine, polyester sulfide, polyvinyl alcohol, polyvinylidene fluoride, a polymer containing ionic dissociation groups, etc.

The inorganic solid electrolyte may include, for example, Li-based nitrides, halides, or sulfates such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, etc.

The lithium salts are readily dissolved in the non-aqueous electrolyte, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroboran lithium, lower aliphatic carboxylic acid lithium, lithium tetraphenyl borate, imides, etc.

In order to improve charge/discharge characteristics and flame retardancy in the lithium salt-containing non-aqueous electrolyte, for example, pyridine, triethyl phosphite, triethanolamine, cyclic ether, ethylene diamine, n-glyme, hexaphosphoric triamide, nitrobenzene derivatives, sulfur, quinoneimine dyes, N-substituted oxazolidinone, N,N-substituted imidazolidine, ethylene glycol dialkylether, ammonium salts, pyrrole, 2-methoxy ethanol, aluminum trichloride, etc. may be added. Optionally, halogen-containing solvents such as carbon tetrachloride or ethylene trifluoride may be further added in order to provide flame resistance, or carbon dioxide gas may be further added in order to enhance high-temperature retention properties, and FEC (fluoro-ethylene carbonate), PRS (propene sultone), etc. may be further added.

In a specific embodiment, lithium salts such as $LiPF_6$, $LiClO_4$, $LiBF_4$, $LiN(SO_2CF_3)_2$, etc. may be added to a mixed solvent of a cyclic carbonate of EC or PC, which is a highly dielectric solvent, and a linear carbonate of DEC, DMC, or EMC, which is a low viscosity solvent, thereby preparing the lithium salt-containing non-aqueous electrolyte.

The lithium secondary battery of one embodiment may be embodied as a battery module including the lithium secondary battery as a unit cell, a battery pack including the battery module, and a device including the battery pack as a power source.

In this regard, specific examples of the device may include electric vehicles, hybrid electric vehicles, plug-in hybrid electric vehicles, electric storage systems, etc., but are not limited thereto.

Effect of the Invention

A positive electrode mix of an embodiment includes an additive including lithium peroxide ($Li_2O_2$) and platinum, a positive electrode active material, and a conductive material, wherein a content of the platinum in the total of 100% by weight of the platinum and the conductive material is controlled to 7% by weight or more to 20% by weight or less. This is of critical significance in that the irreversible capacity imbalance between electrodes may be effectively counterbalanced and the initial charge capacity of the positive electrode may be significantly increased.

BRIEF DESCRIPTION OF DRAWINGS

FIG. 1 is a graph showing initial charge/discharge characteristics of lithium secondary batteries of Example 1 and Comparative Example 1; and FIG. 2 is a graph showing initial charge/discharge characteristics of lithium secondary batteries of Examples 1 and 2 and Comparative Examples 1 and 2.

DETAILED DESCRIPTION OF THE EMBODIMENTS

Hereinafter, the actions and effects of the present disclosure will be described in more detail with reference to specific examples. However, these examples are for illustrative purposes only, and the scope of the present disclosure is not intended to be limited by these examples.

Example 1 (10% by Weight of Pt in Total of 100% by Weight of Pt and Conductive Material)

(1) Preparation of Positive Electrode Mix

A positive electrode mix including lithium peroxide ($Li_2O_2$), platinum (Pt), a conductive material, and a binder was prepared, in which a mixing ratio was controlled such that the content of Pt in the total of 100% by weight of Pt and the conductive material was 10% by weight.

Specifically, lithium peroxide ($Li_2O_2$) to platinum (Pt) to conductive material (carbon black, commercial name: Super C65, Timcal Ltd.) to binder (PVDF, commercial name KF1100, Kureha Corp.)=80:0.8:7.2:12 were blended at this weight ratio, ground using a mortar, and dry-mixed to prepare a positive electrode mix of Example 1.

(2) Fabrication of Positive Electrode and Lithium Secondary Battery

An organic solvent (NMP) was added to the positive electrode mix of Example 1 to prepare a slurry phase, which was then applied onto an aluminum collector, and vacuum-dried in a vacuum oven at 120° C. for 12 hours to obtain a positive electrode of Example 2.

Graphite to conductive material (carbon black, commercial name: Super C65, Timcal Ltd.) to binder (SBR, commercial name: A544, ZEON Corp.) to thickener (CMC.

Daicell 2200, Daicell Corp.)=94.2:2:2.5:1.3 were blended at this weight ratio and dry-mixed to prepare a negative electrode mix.

An organic solvent (NMP) was added to the negative electrode mix to prepare a slurry phase, which was then applied onto a copper collector, and vacuum-dried in a vacuum oven at 120° C. for 12 hours to obtain a negative electrode.

A separator having a thickness of 9 μm and a porosity of 42 vol and being made of PP/PE was interposed between the prepared negative electrode and positive electrode in a battery container, and an electrolyte was injected thereto to fabricate a 2032 full cell-type lithium secondary battery according to a common fabrication method.

As the electrolyte, 1 M (LiPF$_6$) dissolved in a mixed solvent of EC:DMC:DEC at a volume ratio of 1:2:1 (1 M LiPF$_6$ in EC:DMC:DEC=1:2:1 (v:v:v)) was used.

Example 2 (15% by Weight of Pt in Total of 100% by Weight of Pt and Conductive Material)

(1) Preparation of Positive Electrode Mix

A positive electrode mix including lithium peroxide (Li$_2$O$_2$), platinum (Pt), a conductive material, and a binder was prepared, in which a mixing ratio was controlled such that the content of Pt in the total of 100% by weight of Pt and the conductive material was 15% by weight.

Specifically, lithium peroxide (Li$_2$O$_2$) to platinum (Pt) to conductive material (carbon black, commercial name: Super C65, Timcal Ltd.) to binder (PVDF, commercial name KF1100, Kureha Corp.)=80:1.2:6.8:12 were blended at this weight ratio, and ground using a mortar and dry-mixed to prepare a positive electrode mix of Example 2.

(2) Fabrication of Positive Electrode and Lithium Secondary Battery

A positive electrode and a lithium secondary battery of Example 2 were fabricated in the same manner as in Example 1, except that the positive electrode mix of Example 2 was used instead of the positive electrode mix of Example 1.

Comparative Example 1 (No Use of Pt)

(1) Preparation of Positive Electrode Mix

A positive electrode mix of Comparative Example 1 was prepared in the same manner as in Example 1, except that no Pt was used.

(2) Fabrication of Positive Electrode and Lithium Secondary Battery

A positive electrode and a lithium secondary battery of Comparative Example 1 were fabricated in the same manner as in Example 1, except that the positive electrode mix of Comparative Example 1 was used instead of the positive electrode mix of Example 1.

Comparative Example 2 (5% by Weight of Pt in Total of 100% by Weight of Pt and Conductive Material)

(1) Preparation of Positive Electrode Mix

A positive electrode mix including lithium peroxide (Li$_2$O$_2$), platinum (Pt), a conductive material, and a binder was prepared, in which a mixing ratio was controlled such that the content of Pt in the total of 100% by weight of Pt and the conductive material was 5% by weight.

Specifically, lithium peroxide (Li$_2$O$_2$) to platinum (Pt) to conductive material (carbon black, commercial name: Super C65, Timcal Ltd.) to binder (PVDF, commercial name KF1100, Kureha Corp.)=80:0.4:7.6:12 were blended at this weight ratio, and ground using a mortar and dry-mixed to prepare a positive electrode mix of Comparative Example 2.

(2) Fabrication of Positive Electrode and Lithium Secondary Battery

A positive electrode and a lithium secondary battery of Comparative Example 2 were fabricated in the same manner as in Example 1, except that the positive electrode mix of Comparative Example 2 was used instead of the positive electrode mix of Example 1.

Experimental Example 1: Evaluation of Initial Charge/Discharge Characteristics of Battery I For each of the batteries of Example 1 and Comparative Example 1, initial charge/discharge characteristics were evaluated at room temperature under the following conditions. The evaluation results were recorded in FIG. 1.

Charge: 0.01 C, CC/CV, 4.2 V, 5% cut-off
Discharge: 0.01 C, CC, 2.5 V, cut-off

With regard to Example 1 and Comparative Example 1, to examine the effects of the additives of the examples on initial performance of the battery, no positive electrode active material was blended as an extreme case, or each additive was blended with a common positive electrode active material at the same blending amounts to prepare each of the positive electrode mixes of Example 1 and Comparative Example 1, which was applied to fabricate a positive electrode and a lithium secondary battery.

As described above, lithium peroxide (Li$_2$O$_2$) is a compound capable of theoretically irreversibly releasing 1 mole of oxygen and 2 moles of lithium ions per 1 mole thereof according to the following Reaction Scheme 1.

$$Li_2O_2 \rightarrow 2Li^+ + O_2 \qquad \text{[Reaction Scheme 1]}$$

However, according to FIG. 1, when the positive electrode mix without Pt of Comparative Example 1 was applied, reaction efficiency of the battery of Comparative Example 1 was poor at an initial charge voltage, for example, 2.5 to 4.25 V (vs. Li/Li$^+$), and the initial charge capacity of the positive electrode was found to be only about 180 mAh/g.

In contrast, when the positive electrode mix of Example 1, in which platinum (Pt) was added in an amount of ⅛ of the weight of the conductive material, together with lithium peroxide (Li$_2$O$_2$), was applied, the positive electrode of Example 1 showed improved initial charge capacity of about 700 mAh/g under the same conditions as in Comparative Example 1.

These results suggest that when platinum (Pt) together with lithium peroxide (Li$_2$O$_2$) are applied to the positive electrode, reaction efficiency of Reaction Scheme 1 may be improved, and therefore the released lithium ions may effectively counterbalance the irreversible capacity imbalance of the negative electrode and may further increase the initial efficiency of the positive electrode.

In this experimental example, to examine the effects of the additives of the examples on the initial performance of batteries, no positive electrode active material was blended as an extreme case. However, in order to secure long-term lifetime characteristics while further improving the initial performance of batteries, the positive electrode active material may be used together with the positive electrode additive of one embodiment at a proper blending ratio according to desired battery characteristics.

Experimental Example 2: Evaluation of Initial Charge/Discharge Characteristics of Battery II Meanwhile, when platinum (Pt) was applied to the positive electrode mix, initial charge capacity and initial efficiency of the positive electrode were improved, and in particular, when the content of platinum in the total of 100% by weight of the platinum and the conductive material was controlled to 7% by weight or more to 20% by weight or less, more specifically 8% by weight or more to 17% by weight or less, much more specifically 10% by weight or more to 15% by weight or less, critical effects were observed.

To confirm this fact, for each of the batteries of Examples 1 and 2 and Comparative Examples 1 and 2, initial charge/discharge characteristics were evaluated at room temperature under the following conditions. The evaluation results are recorded in FIG. 2.

Charge: 0.01 C, CC/CV, 4.2 V, 5% cut-off
Discharge: 0.01 C, CC, 2.5 V, cut-off

According to FIG. 2, when the positive electrode mix without Pt of Comparative Example 1 was applied, reaction efficiency of the battery of Comparative Example 1 was poor at an initial charge voltage, for example, 2.5 to 4.25 V (vs. Li/Li$^+$), and the initial charge capacity of the positive electrode was found to be only about 195 mAh/g.

In contrast, when platinum (Pt) was added together with lithium peroxide (Li$_2$O$_2$) while controlling the content of Pt in the total of 100% by weight of Pt and the conductive material to 10% by weight (Example 1) and 15% by weight (Example 2), the positive electrodes showed improved initial charge capacity of about 699 mAh/g (Example 1) and about 702 mAh/g (Example 2), as compared with that of Comparative Example 1.

However, when platinum (Pt) was added together with lithium peroxide (Li$_2$O$_2$) while controlling the content of Pt in the total of 100% by weight of Pt and the conductive material to 5% by weight (Comparative Example 2), the positive electrode showed improved initial charge capacity of about 315 mAh/g, as compared with that of Comparative Example 1, but the initial charge capacity was merely about 50% of those of Examples 1 and 2.

These results suggest that when platinum (Pt) together with lithium peroxide (Li$_2$O$_2$) are applied to the positive electrode mix while controlling the content of Pt in the total of 100% by weight of Pt and the conductive material to 7% by weight or more to 20% by weight or less, more specifically 8% by weight or more to 17% by weight or less, much more specifically 10% by weight or more to 15% by weight or less, the effects of improving the initial charge capacity and the initial efficiency of the positive electrode are of critical significance in that the initial charge capacity of the positive electrode was 600 mAh/g or more, more specifically 690 mAh/g or more.

In this experimental example, to examine the effects of the additives of the examples on the initial performance of batteries, no positive electrode active material was blended as an extreme case. However, in order to secure long-term lifetime characteristics while further improving the initial performance of batteries, the positive electrode active material may be used together with the positive electrode additive of one embodiment at a proper blending ratio according to desired battery characteristics.

The invention claimed is:

1. A positive electrode mix comprising:
a positive electrode active material including lithium and one or more of composite oxides of cobalt, manganese, nickel, or a combination thereof;
a conductive material; and
an additive including lithium peroxide (Li$_2$O$_2$) and platinum, wherein a content of the platinum in the total of 100% by weight of the platinum and the conductive material is 7% by weight or more to 20% by weight or less, and
wherein a weight ratio of the lithium peroxide and the platinum is 100:0.5 to 100:20.

2. The positive electrode mix of claim 1, wherein a weight ratio of the lithium peroxide and the platinum is 100:1 to 100:10 (Li$_2$O$_2$:Pt).

3. The positive electrode mix of claim 2, wherein a weight ratio of the lithium peroxide and the platinum is 100:2 to 100:8 (Li$_2$O$_2$:Pt).

4. The positive electrode mix of claim 3, wherein a weight ratio of the lithium peroxide and the platinum is 100:4 to 100:7 (Li$_2$O$_2$:Pt).

5. The positive electrode mix of claim 1, wherein a content of the additive including lithium peroxide (Li$_2$O$_2$) and platinum in the total weight (100% by weight) of the positive electrode mix is 5% by weight to 10% by weight.

6. The positive electrode mix of claim 1, wherein a content of the conductive material in the total weight (100% by weight) of the positive electrode mix is 0.1% by weight to 10% by weight.

7. The positive electrode mix of claim 1, wherein the conductive material includes one or more selected from the group consisting of natural graphite, artificial graphite, carbon black, acetylene black, Ketjen black, carbon fibers, metallic powders, metallic fibers, and polyphenylene derivatives.

8. The positive electrode mix of claim 1, wherein a content of the positive electrode active material in the total weight (100% by weight) of the positive electrode mix is 86% by weight to 88% by weight.

9. The positive electrode mix of claim 1, wherein the positive electrode active material includes one or more of composite oxides of a metal of cobalt, manganese, nickel, or a combination thereof and lithium.

10. The positive electrode mix of claim 1, further comprising a binder.

11. A positive electrode comprising the positive electrode mix of claim 1.

12. A lithium secondary battery comprising the positive electrode of claim 11, a negative electrode, and an electrolyte.

13. The lithium secondary battery of claim 12, wherein when the lithium secondary battery is charged at room temperature to 2.5 to 4.25 V (vs. Li/Li$^+$) once, a charge capacity of the positive electrode is 600 mAh/g or more.

14. The lithium secondary battery of claim 12, wherein the negative electrode includes one or more negative electrode active materials selected from the group consisting of carbon-based negative electrode active materials, a lithium metal, an alloy of a lithium metal, Si, SiO$_x$ (0<x<2), a Si—C composite, a Si-Q alloy (wherein Q is an alkali metal, an alkaline earth metal, an element of Group 13 to Group 16, a transition metal, a rare earth element, or a combination thereof, excluding Si), Sn, SnO$_2$, a Sn—C composite, and Sn—R (wherein R is an alkali metal, an alkaline earth metal, an element of Group 13 to Group 16, a transition metal, a rare earth element, or a combination thereof, excluding Sn).

* * * * *